US011489312B2

(12) United States Patent
Winzer et al.

(10) Patent No.: US 11,489,312 B2
(45) Date of Patent: Nov. 1, 2022

(54) AMPLIFIED OPTICAL LINK HAVING A FAULT-PROTECTION CAPABILITY

(71) Applicant: Nokia of America Corporation, Murray Hill, NJ (US)

(72) Inventors: Peter J. Winzer, Aberdeen, NJ (US); Ronen Dar, Hoboken, NJ (US); Szilard Zsigmond, New Providence, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 988 days.

(21) Appl. No.: 16/223,564

(22) Filed: Dec. 18, 2018

(65) Prior Publication Data

US 2019/0190231 A1    Jun. 20, 2019

Related U.S. Application Data

(60) Provisional application No. 62/607,999, filed on Dec. 20, 2017.

(51) Int. Cl.
*H01S 3/23* (2006.01)
*H04B 10/80* (2013.01)
(Continued)

(52) U.S. Cl.
CPC ....... *H01S 3/2316* (2013.01); *H04B 10/2935* (2013.01); *H04B 10/808* (2013.01);
(Continued)

(58) Field of Classification Search
None
See application file for complete search history.

(56) References Cited

U.S. PATENT DOCUMENTS 8,280,253 B2  10/2012 Genay et al.
8,502,964 B2   8/2013 Wang et al.
(Continued)

FOREIGN PATENT DOCUMENTS

EP   3404852 A1   11/2018
EP   3404855 A1   11/2018

OTHER PUBLICATIONS

"Series G: Transmission Systems and Media, Digital Systems and Networks" ITU-T Recommendation; Supplement 41; International Telecommunication Union; Jun. 2010; 54 pages.
(Continued)

*Primary Examiner* — Jerry Rahll
(74) *Attorney, Agent, or Firm* — Mendelsohn Dunleavy, P.C.; Yuri Gruzdkov; Steve Mendelsohn (57) ABSTRACT

An amplified optical link having a fault-protection capability that is based, at least in part, on the ability to selectively and independently power up and down different groups of optical amplifiers within the link. In an example embodiment, the optical link is implemented using an optical fiber cable having an electrical power line and arrays of optical amplifiers connected between successive optical fiber segments to form a plurality of disjoint groups of parallel optical paths between the ends of the optical fiber cable. The electrical power line is operable to selectively power, as a group, the optical amplifiers of at least some of the disjoint groups. In various embodiments, different optical paths can be implemented using different respective strands of a single-core optical fiber, different respective cores of a multi-core optical fiber, and/or different respective sets of spatial modes of a multimode optical fiber.

20 Claims, 7 Drawing Sheets

(51) Int. Cl.
| | |
|---|---|
| *H04B 10/293* | (2013.01) |
| *H01S 3/08* | (2006.01) |
| *H01B 9/00* | (2006.01) |
| *H04B 10/66* | (2013.01) |
| *H04J 14/02* | (2006.01) |
| *H04B 10/50* | (2013.01) |
| *H04B 10/2581* | (2013.01) |
| *H04B 10/27* | (2013.01) |
| *H04B 10/29* | (2013.01) |

(52) U.S. Cl.
CPC .......... *H01B 9/005* (2013.01); *H01S 3/08013* (2013.01); *H04B 10/2581* (2013.01); *H04B 10/27* (2013.01); *H04B 10/29* (2013.01); *H04B 10/50* (2013.01); *H04B 10/66* (2013.01); *H04J 14/02* (2013.01)

(56) References Cited

U.S. PATENT DOCUMENTS

| | | |
|---|---|---|
| 8,805,183 B2 | 8/2014 | Dvir |
| 8,837,938 B2 | 9/2014 | Liu et al. |
| 8,942,556 B2 | 1/2015 | Zhao et al. |
| 9,008,503 B2 | 4/2015 | Urban et al. |
| 9,036,991 B2 | 5/2015 | Aguren |
| 9,042,721 B2 | 5/2015 | Randel et al. |
| 9,143,228 B2 | 9/2015 | Sandstrom |
| 9,170,173 B2 | 10/2015 | Perron et al. |
| 9,240,836 B1 | 1/2016 | Chen |
| 9,310,274 B2 | 4/2016 | Nagel et al. |
| 9,341,543 B2 | 5/2016 | Viswanathan |
| 9,344,779 B2 | 5/2016 | Sethumadhavan et al. |
| 2011/0216996 A1 | 9/2011 | Rogers |
| 2013/0216176 A1 | 8/2013 | Li et al. |
| 2014/0212130 A1 | 7/2014 | Urban et al. |

OTHER PUBLICATIONS

"Series G: Transmission Systems and Media, Digital Systems and Networks, Transmission media and optical systems characteristics—Characteristics of optical systems;" ITU-T Recommendation G.694.1; International Telecommunication Union; Feb. 2012; 16 pages.
"Series G: Transmission Systems and Media, Digital Systems and Networks, Digital sectons and digital line system—optical fibre submarine cable systems;" ITU-T Recommendation G.979 International Telecommunication Union; Nov. 2016; 16 pages.
Balemarthy, K., et al. "Bit rate-distance product limits for uncompensated coherent multi-core fiber links under total power constraint," In 2015 IEEE. European Conference on Optical Communication (ECOC); pp. 1-3.
Bocherer, G. et al. "Bandwidth efficient and rate-matched low-density parity-check coded modulation." IEEE Transactions on Communications 63.12 (2015): 4651-4665.
Buchali, Fred, et al. "Rate adaptation and reach increase by probabilistically shaped 64-QAM: An experimental demonstration." Journal of Lightwave Technology 34.7 (2016): 1599-1609.
Chen, X., et al. "Closed-form expressions for nonlinear transmission performance of densely spaced coherent optical OFDM systems." Optics Express 18.18 (2010): 19039-19054.
Cho, J., et al. "Trans-Atlantic field trial using probabilistically shaped 64 QAM at high spectral efficiencies and single carrier real-time 250-GB/s 16-QAM." 2017 Optical Fiber Communications Conference and Exhibition (OFC). IEEE, 2017.
Dar, Ronen, et al. "Accumulation of nonlinear interference noise in fiber-optic systems." Optics express 22.12 (2014): 14199-14211.
Dar, R., et al. "Nonlinear interference mitigation: Methods and potential gain." Journal of Lightwave Technology 35.4 (2017): 903-930.
Dar, R., et al. "Submarine Cable Cost Reduction Through Massive SDM." Optical Communication (ECOC), 2017 European Conference on. IEEE, 2017.
Dar, R., et al. "Nonlinear Interference noise wizard," 2017, as retrieved from: https://web.archive.org/web/20170530134001/http://nlinwizard.eng.tau.ac.il/.
Debruslais, S., "Maximizing the capacity of ultra-long haul submarine systems." 2015 20th European Conference on Networks and Optical Communications-(NOC). IEEE, 2015; pp. 1-6.
Domingues, O. D., et al. "Achievable rates of space-division multiplexed submarine links subject to nonlinearities and power feed constraints." Journal of Lightwave Technology 35.18 (2017): 4004-4010.
Domingues, O. D., et al. "Capacity limits of space-division multiplexed submarine links subject to nonlinearities and power feed constraints," Optical Fiber Communications Conference and Exhibition (OFC). IEEE, 2017, 3 pages.
Doran, N. J , and A. D. Ellis. "Minimising total energy requirements in amplified links by optimising amplifier spacing." Optics express 22.16 (2014): 19810-19817.
Downie, J. D. "Maximum cable capacity in submarine systems with power feed constraints and implications for SDM requirements." European Conference on Optical Communication (ECOC). IEEE, 2017; 3 pages.
Du, L. B., et al. "Optimizing the subcarrier granularity of coherent optical communications systems." Optics express 19.9 (2011): 8079-8084.
Essiambre, R., et al. "Capacity limits of optical fiber networks." Journal of Lightwave Technology 28.4 (2010): 662-701.
Frisch, T., et al. "Electrical power, a potential limit to cable capacity." Proc. SubOptic. 2013; pp. 1-6.
Ghazisaeidi, A., et al. "Advanced C+ L-band transoceanic transmission systems based on probabilistically shaped PDM-64QAM." Journal of Lightwave Technology 35.7 (2017): 1291-1299.
Juodawlkis, P. W., et al. "High-power, low-noise 1 5-μm slab-coupled optical waveguide (SCOW) emitters: physics, devices, and applications." IEEE Journal of Selected Topics in Quantum Electronics 17.6 (2011): 1698-1714.
Maher, R., et al. "Capacity approaching transmission using probabilistic shaping and DBP for PFE constrained submarine optical links." ECOC 2016; 42nd European Conference on Optical Communication. VDE, 2016; pp. 52-54.
Mateo, Eduardo, et al. "Capacity limits of submarine cables." Proc. SubOptic. 2016; pp. 1-6.
Metz, C. M., "Facebook and Microsoft are Laying a Giant Cable Across the Atlantic," 2016, as retrieved from: https://www.wired.com/2016/05/facebook-microsoft-laying-giant-cable-across-atlantic/; 3 pages.
Mecozzi, A., et al. "Nonlinear Shannon limit in pseudolinear coherent systems." Journal of Lightwave Technology 30.12 (2012): 2011-2024.
Pilipetskii, A. N., "High capacity submarine transmission systems." Optical Fiber Communication Conference. Optical Society of America, 2015; pp. 1-33.
Pilipetskii, A., et al. "The role of SDM in future transoceanic transmission systems." 2017 European Conference on Optical Communication (ECOC). IEEE, 2017; 3 pages.
Poggiolini, Pierluigi, et al. "The GN-model of fiber non-linear propagation and its applications." Journal of lightwave technology 32.4 (2014): 694-721.
Poggiolini, Pierluigi, et al. "Analytical and experimental results on system maximum reach increase through symbol rate optimization." Journal of Lightwave Technology 34.8 (2016): 1872-1885.
Renaudier, J., et al. "First 100-nm continuous-band WDM transmission system with 115Tb/s transport over 100km using novel ultra-wideband semiconductor optical amplifiers." 2017 European Conference on Optical Communication (ECOC). IEEE.
Saitoh, Kunimasa, and Shoichiro Matsuo. "Multicore fiber technology." Journal of Lightwave Technology 34.1 (2016): 55-66.
Secondini, Marco, and Enrico Forestieri. "Scope and limitations of the nonlinear Shannon limit." Journal of Lightwave Technology 35.4 (2017): 893-902.
Serena, Paolo. "Nonlinear signal-noise interaction in optical links with nonlinear equalization." Journal of Lightwave Technology 34.6 (2016): 1476-1483.

(56) References Cited

OTHER PUBLICATIONS

Sinkin, Oleg V., et al. "Maximum optical power efficiency in SDM-based optical communication systems." IEEE Photonics Technology Letters 29.13 (2017): 1075-1077.
Sun, Yu, et al. "SDM for power efficient transmission." 2017 Optical Fiber Communications Conference and Exhibition (OFC). IEEE, 2017.
Takehira, Koji. "Submarine system powering." Undersea Fiber Communication Systems. Academic Press, 2016. 381-402.
Tang, Yan, William Shieh, and Brian S. Krongold. "DFT-spread OFDM for fiber nonlinearity mitigation." IEEE Photonics Technology Letters 22.16 (2010): 1250-1252.
Turukhin, Alex, et al. "105.1 Tb/s power-efficient transmission over 14,350 km using a 12-core fiber." 2016 Optical Fiber Communications Conference and Exhibition (OFC). IEEE, 2016; 3 pages.
Winzer, Peter J., and Marcus Duelk. "Reliability considerations for parallel 100G carrier-grade Ethernet transport." IEEE HSSG Meeting. 2007; 14 pages.
Xia, C., et al. "Impact of channel count and PMD on polarization-multiplexed QPSK transmission." Journal of Lightwave Technology 29.21 (2011): 3223-3229.

AMPLIFIED OPTICAL LINK HAVING A FAULT-PROTECTION CAPABILITY

CROSS-REFERENCE TO RELATED APPLICATIONS

This application claims the benefit of U.S. Provisional Patent Application No. 62/607,999, filed on 20 Dec. 2017, and entitled "SYSTEM ARCHITECTURE FOR OPTICAL-SIGNAL TRANSPORT USING SPACE-DIVISION MULTIPLEXING," which is incorporated herein by reference in its entirety.

BACKGROUND

Field

Various example embodiments relate to optical communication equipment and, more specifically but not exclusively, to methods and apparatus for transmitting optical signals using amplified long-haul optical links.

Description of the Related Art

This section introduces aspects that may help facilitate a better understanding of the disclosure. Accordingly, the statements of this section are to be read in this light and are not to be understood as admissions about what is in the prior art or what is not in the prior art.

Subsea network operators are facing a fast growth in bandwidth demand, in part due to the development and deployment of cloud-based services. As a result, they need to optimize the capacity and performance of their fiber-optic cable plants to enable the corresponding networks to efficiently handle the increasing data flows. Due to this need, one of the requirements to telecom equipment manufacturers is to provide the network operator(s) with systems that can be used to operate the submerged plant elements in a manner that guarantees fast fault detection and mitigation, improved maintainability, good performance characteristics throughout the cable-plant's lifespan, upgradable capacity, and/or any other pertinent benchmarks. It is also desirable for the cable plant to be amenable to relatively low-cost implementation and/or maintenance.

SUMMARY OF SOME SPECIFIC EMBODIMENTS

Disclosed herein are various embodiments of an amplified optical link having a fault-protection capability that is based, at least in part, on the ability to selectively and independently power up and down different groups of optical amplifiers within the link. In an example embodiment, the optical link is implemented using an optical fiber cable having an electrical power line and arrays of optical amplifiers connected between successive optical fiber segments to form a plurality of disjoint groups of parallel optical paths between the terminal ends of the optical fiber cable. The electrical power line is operable to selectively power, as a group, the optical amplifiers of at least some of the disjoint groups.

In various embodiments, different optical paths can be implemented using different respective strands of a single-core optical fiber, different respective cores of a multi-core optical fiber, and/or different respective sets of spatial modes of a multimode optical fiber.

Some embodiments can be used to implement undersea cable systems. Advantageously, embodiments having about 100 parallel optical paths may be capable of achieving lower cost per bit and/or higher reliability than conventional undersea cable systems.

According to an example embodiment, provided is an apparatus, comprising: an optical fiber cable having an electrical power line, a sequence of optical fiber segments, and a plurality of optical amplifiers, the optical amplifiers connecting successive ones of the optical fiber segments to form at least first and second disjoint groups of parallel optical paths between ends of the optical fiber cable, the electrical power line being connectable to power the optical amplifiers; and wherein the electrical power line is operable to selectively power, as a group, the optical amplifiers of either of the first and second disjoint groups.

According to another example embodiment, provided is an apparatus, comprising: an optical fiber cable having an electrical power line, a sequence of optical fiber segments, and a plurality of optical amplifiers, the optical amplifiers connecting successive ones of the optical fiber segments to form at least first and second parallel optical paths between ends of the optical fiber cable, the electrical power line being connectable to power the optical amplifiers; and wherein the electrical power line is operable to selectively power, as a group, the optical amplifiers of either of the first and second parallel optical paths.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
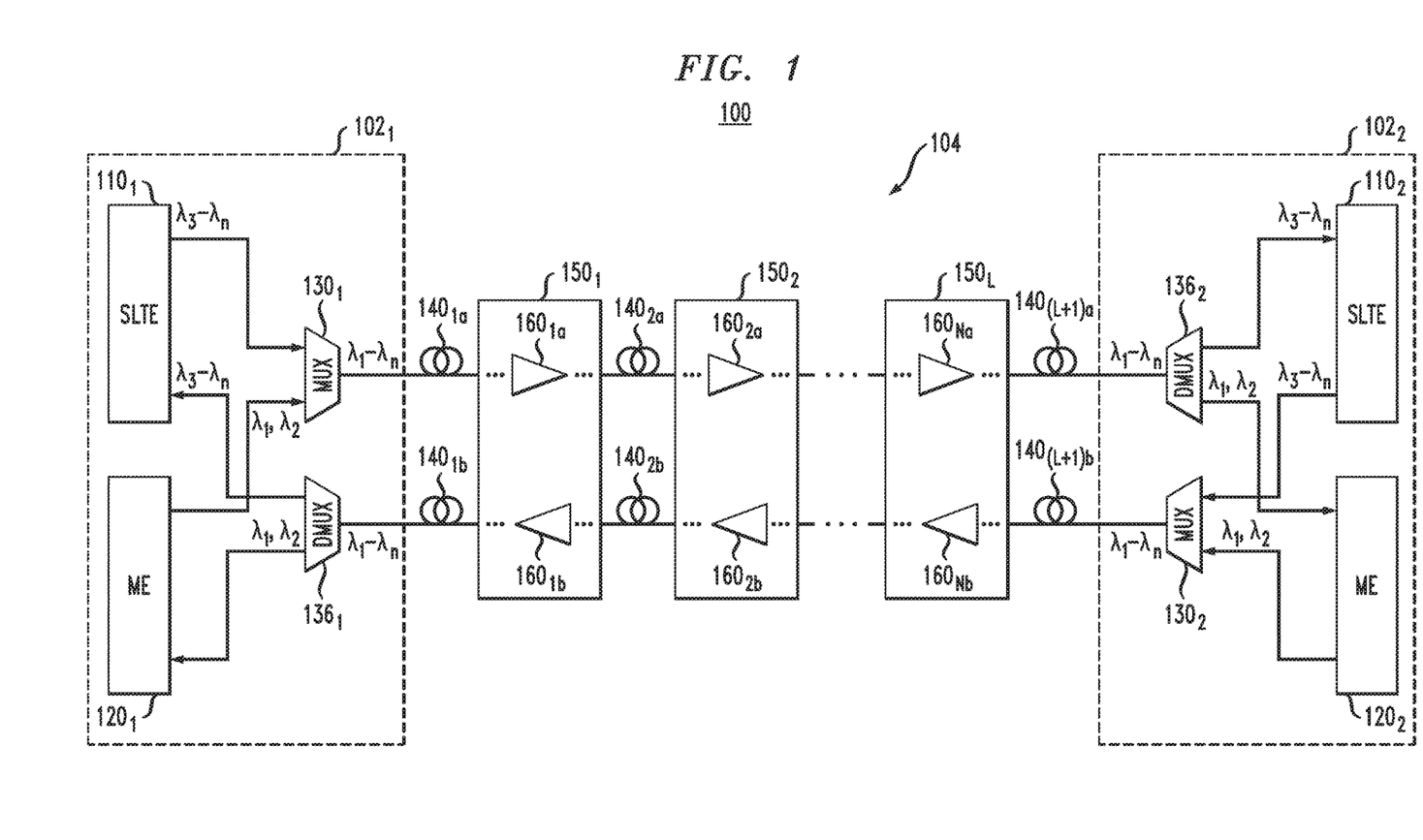
FIG. 1 shows a block diagram of an optical communication system according to an embodiment.

FIG. 1 shows a block diagram of an optical communication system 100 according to an embodiment. In the shown embodiment, system 100 comprises landing stations $102_1$ and $102_2$ connected by way of a wet plant 104. Landing stations $102_1$ and $102_2$ are typically further connected to respective terrestrial networks (not explicitly shown in FIG. 1). In an alternative embodiment, system 100 may have additional landing stations connected to wet plant 104, as known in the pertinent art, e.g., using one or more branching units (not explicitly shown in FIG. 1).

In an example embodiment, wet plant 104 comprises an undersea cable system that includes, inter alia, submersible optical repeaters 150$_1$-150$_L$ serially connected by spans 140 of optical fiber, e.g., as indicated in FIG. 1, where L is a positive integer. In the shown embodiment, each span 140$_i$ includes two optical fibers, which are labeled 140$_{ia}$ and 140$_{ib}$, respectively, where i=1, 2, . . . , L+1. The number L of optical repeaters 150 used in wet plant 104 depends on the particular embodiment and may be in the range, e.g., from 1 to ~200. A typical length of a fiber span 140$_i$ may range from ~50 km to ~100 km, depending on the distance between landing stations 102$_1$ and 102$_2$.

Figure 3:
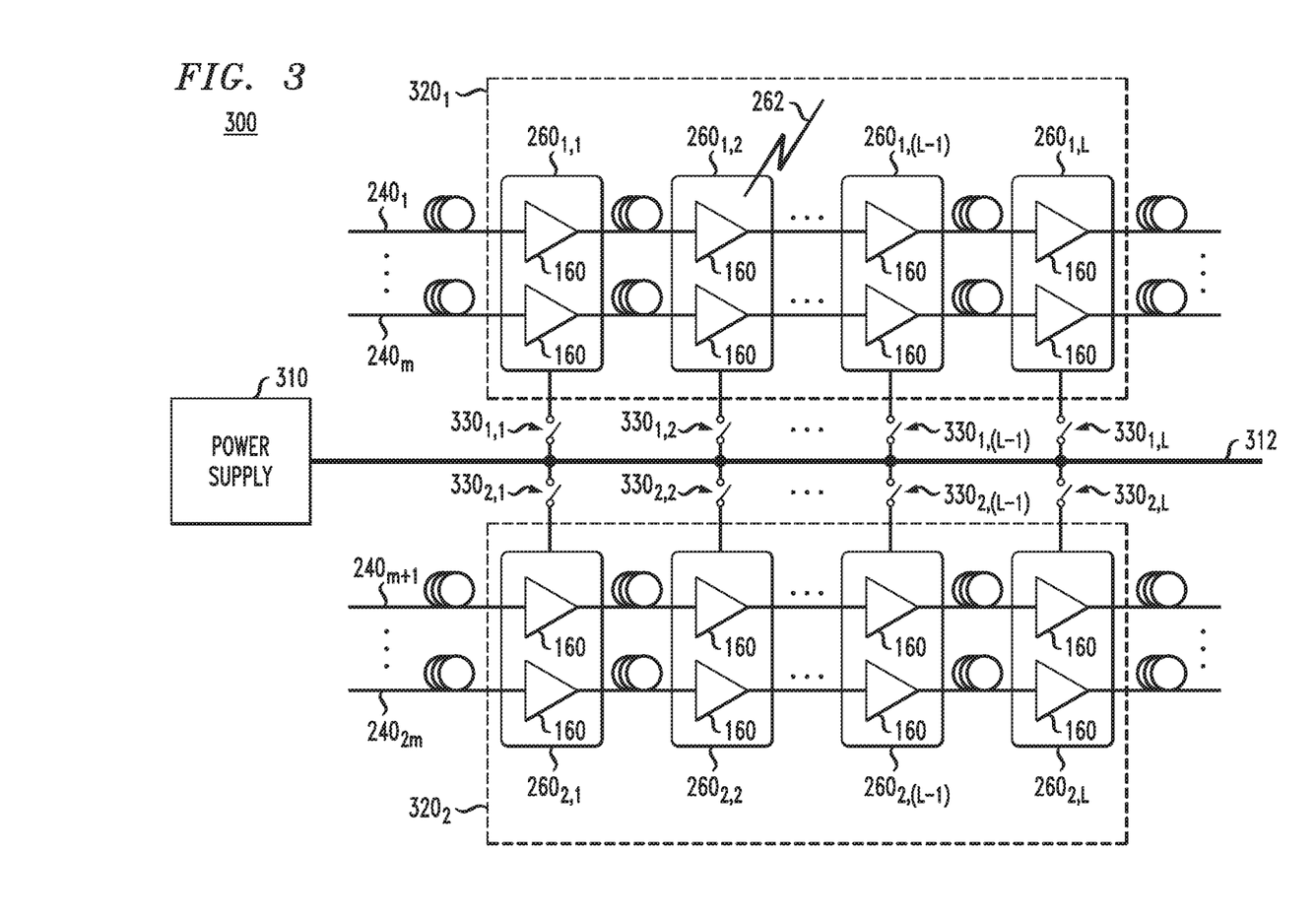
FIG. 3 shows a block diagram of a power-supply subsystem that can be used in the system of FIG. 2 according to an embodiment.

In the shown embodiment, an optical repeater 150$_j$ comprises optical amplifiers (OAs) 160$_{ja}$ and 160$_{jb}$, where j=1, 2, . . . , L. Optical amplifier 160$_{ja}$ is configured to amplify optical signals traveling towards landing station 102$_2$. Optical amplifier 160$_{jb}$ is similarly configured to amplify optical signals traveling towards landing station 102$_1$. In an example embodiment, an optical amplifier 160$_j$ can be implemented as known in the pertinent art, e.g., using an erbium-doped fiber, a gain-flattening filter, and one or more laser-diode pumps. The laser diodes can be powered by a DC current from the corresponding shore-based power-feeding equipment (PFE, not explicitly shown in FIG. 1; see FIG. 3), fed through the electrical conductor(s) of the corresponding submarine cable, which also typically contains optical fibers 140$_{ia}$ and 140$_{ib}$. An example of such electrical conductors is shown in FIG. 3 under the reference numeral 312. In some embodiments, the electrical conductors (e.g., wires) may be located near the center of the submarine cable. In some other embodiments, the electrical conductors may have a generally tubular shape, e.g., with a ring-like cross-section in a plane orthogonal to the longitudinal axis of the submarine cable.

In an alternative embodiment, optical repeaters 150 can be designed for two, three, four, or more pairs of optical fibers 140$_i$ connected thereto at each side thereof. For example, an optical repeater 150 designed to be compatible with a four-fiber-pair submarine cable typically includes eight optical amplifiers 160 arranged in four amplifier pairs, each pair being similar to optical amplifiers 160$_{ja}$ and 160$_{jb}$.

In various embodiments, optical fibers 140 can be implemented using single-mode fibers, multi-mode-fibers, and/or multi-core fibers.

Optical repeater 150$_j$ may also comprise a supervisory optical circuit (not explicitly shown in FIG. 1) that enables monitoring equipment (ME) units 120$_1$ and 120$_2$ located at landing stations 102$_1$ and 102$_2$, respectively, to monitor the operating status of the optical repeaters. Example embodiments of the supervisory optical circuit that can be used in optical repeater 150$_j$ are described, e.g., in European Patent Application Nos. EP17305569.0 and EP17305570.8, both of which are incorporated herein by reference in their entirety.

In an example embodiment, each of ME units 120$_1$ and 120$_2$ is configured to use dedicated supervisory wavelengths (labeled $\lambda_1$ and $\lambda_2$) to generate respective supervisory signals that can be sent through the corresponding fiber(s) 140 towards the remote landing station 102. The supervisory optical circuit of each optical repeater 150$_j$ is configured to loop back, in the opposite direction, at least a portion of a supervisory signal. As a result, ME unit 120$_1$ can receive a looped-back supervisory signal comprising the portions of the original supervisory signal returned to that ME unit by the different supervisory optical circuits of different optical repeaters 150$_1$-150$_N$. Similarly, ME unit 120$_2$ can receive a looped-back supervisory signal comprising the portions of the corresponding supervisory signal returned to that ME unit by the different supervisory optical circuits of different optical repeaters 150$_1$-150$_N$. The looped-back supervisory signals received by ME units 120$_1$ and 120$_2$ can be processed and analyzed to determine the present operating status and/or certain operating characteristics of at least some or all of optical repeaters 150$_1$-150$_N$ in wet plant 104. The determined parameters may include but are not limited to: (i) input and output signal levels and the gains of some or all individual optical amplifiers (OAs) 160$_{ja}$ and 160$_{jb}$; (ii) non-catastrophic faults in individual optical fibers 140$_i$, such as any gradual loss increases therein; and (iii) catastrophic failures in individual optical repeaters 150$_j$ and/or optical fibers 140$_i$.

Landing station 102$_1$ comprises a submarine line terminal equipment (SLTE) unit 110$_1$ and ME unit 120$_1$ connected to wet plant 104 by way of a wavelength multiplexer (MUX) 130$_1$ and a wavelength de-multiplexer (DMUX) 136$_1$ as indicated in FIG. 1. In an example embodiment, SLTE unit 110$_1$ includes a wavelength-division-multiplexing (WDM) transceiver (not explicitly shown in FIG. 1; see FIG. 2) configured to transmit and receive payload-carrying optical signals using carrier wavelengths $\lambda_3$-$\lambda_n$, where n generally denotes the number of WDM channels in system 100. The number n can be in the range, e.g., between ~10 and ~150.

In an example embodiment, carrier wavelengths $\lambda_1$-$\lambda_n$ can be selected in accordance with a frequency (wavelength) grid, such as a frequency grid that complies with the ITU-T G.694.1 Recommendation, which is incorporated herein by reference in its entirety. The frequency grid used in system 100 can be defined, e.g., in the frequency range from about 184 THz to about 201 THz, with a 100, 50, 25, or 12.5-GHz spacing of the channels therein. While typically defined in frequency units, the parameters of the grid can equivalently be expressed in wavelength units. For example, in the wavelength range from about 1528 nm to about 1568 nm, the 100-GHz spacing between the centers of neighboring WDM channels is equivalent to approximately 0.8-nm spacing. In alternative embodiments, other fixed or flexible (flex) frequency grids can be used as well.

In operation, MUX 130$_1$ multiplexes the optical signals of carrier wavelengths $\lambda_3$-$\lambda_n$ generated by SLTE unit 110$_1$ and the supervisory optical signals of carrier wavelengths $\lambda_1$ and $\lambda_2$, and applies the resulting multiplexed optical signal to optical fiber 140$_{1a}$. DMUX 136$_1$ de-multiplexes a multiplexed optical signal received from optical fiber 140$_{1b}$ into two portions. The first portion has optical signals of carrier wavelengths $\lambda_3$-$\lambda_n$ and is directed to SLTE unit 110$_1$. The second portion has the looped-back supervisory optical signals of carrier wavelengths $\lambda_1$ and $\lambda_2$ and is directed to ME unit 120$_1$.

In an example embodiment, ME unit 120$_1$ comprises an optical time-domain reflectometer (OTDR, not explicitly shown in FIG. 1) configured to optically probe wet plant 104 using carrier wavelengths $\lambda_1$ and $\lambda_2$. For example, ME unit 120$_1$ can be designed to perform OTDR measurements by detecting and processing the looped-back supervisory optical signals received from optical repeaters 150$_1$-150$_N$. In general, ME unit 120$_1$ can be configured to use any suitable OTDR method. Some embodiments of ME unit 120$_1$ may benefit from the use of at least some OTDR features and/or techniques disclosed, e.g., in U.S. Pat. Nos. 9,341,543, 9,310,274, 9,240,836, 9,170,173, 9,143,228, 9,042,721, 9,036,991, 9,008,503, 8,942,556, 8,837,938, 8,805,183, 8,502,964, and 8,280,253 and U.S. Patent Application Publication Nos. 2011/0216996, 2013/0216176, and 2014/0212130, all of which are incorporated herein by reference in their entirety.

Landing station $102_2$ is analogous to landing station $102_1$ and comprises an SLTE unit $110_2$, ME unit $120_2$, a MUX $130_2$, and a DMUX $136_2$. The analogous elements/components of the two landing stations are labeled in FIG. 1 using the same numerical labels, but with different respective subscripts. The descriptions of SLTE unit $110_1$, ME unit $120_1$, MUX $130_1$, and DMUX $136_1$ of landing station $102_1$ given above generally apply to SLTE unit $110_2$, ME unit $120_2$, MUX $130_2$, and DMUX $136_2$, respectively, of landing station $102_2$ and are not repeated here.

In various embodiments, each of landing stations $102_1$ and $102_2$ may further include one or more of the following conventional elements/components: (i) power feeding equipment (see, e.g., FIG. 3); (ii) system supervisory equipment; (iii) network management equipment; (iv) cable termination boxes; (v) network protection equipment; and (vi) various interface circuits.

In some embodiments, a single respective carrier wavelength can be used at each of ME units $120_1$ and $120_2$ to generate supervisory optical signals. In some other embodiments, more than two carrier wavelengths of the WDM set $\lambda_1$-$\lambda_n$ can be allocated for supervisory functions. A person of ordinary skill in the art will understand, without undue experimentation, how to modify MUXes 130, DMUXes 136, and/or other pertinent system components to be compatible with such alternative WDM-channel allocations for supervisory functions.

Figure 2:
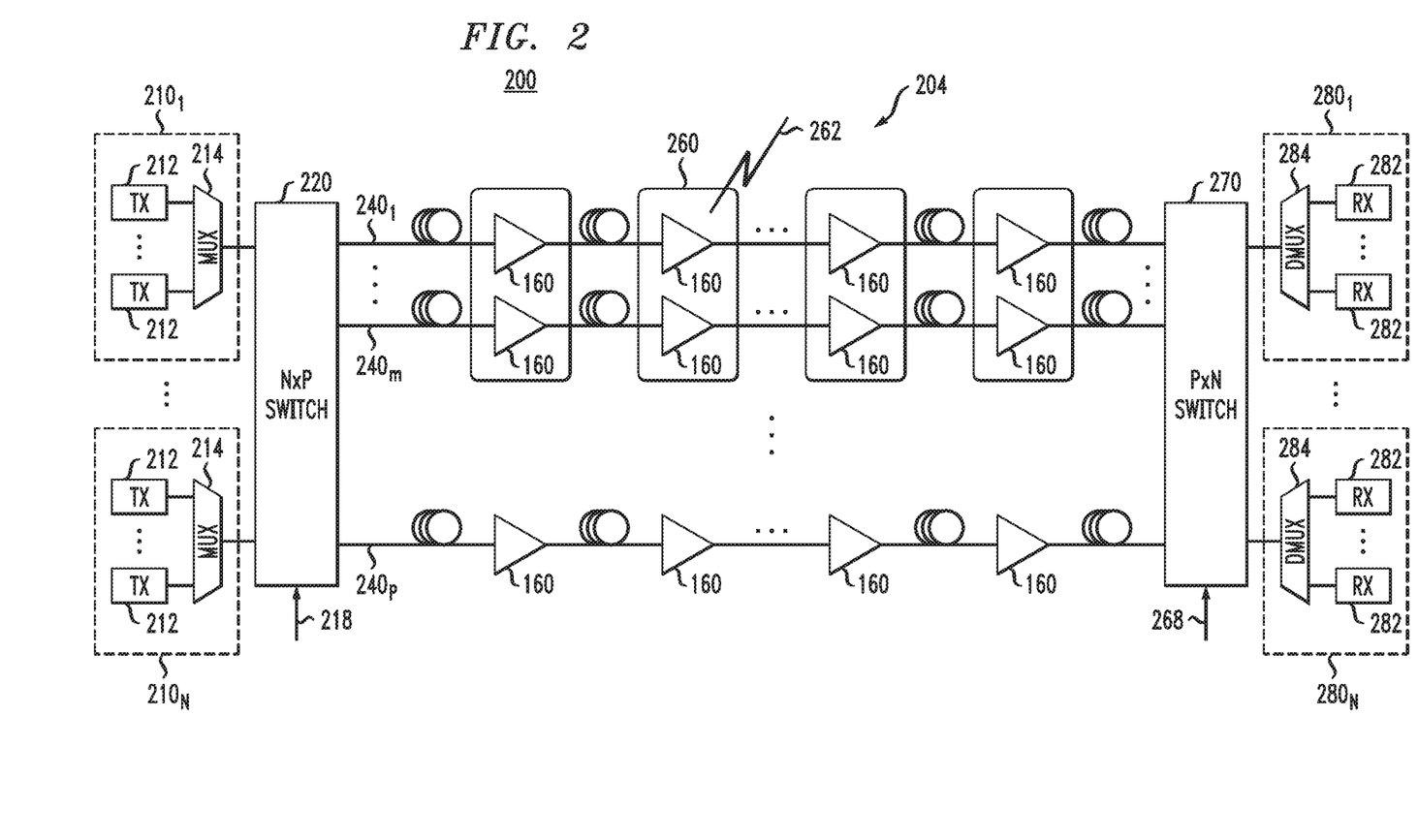
FIG. 2 shows a block diagram of a unidirectional optical communication system that can be used in the optical communication system of FIG. 1 according to an embodiment.

FIG. 2 shows a block diagram of a unidirectional optical communication system 200 that can be used in system 100 (FIG. 1) according to an embodiment. For example, two instances (nominal copies) of system 200, one per signal-propagation direction, can be used in system 100.

System 200 comprises WDM transmitters $210_1$-$210_N$ and WDM receivers $280_1$-$280_N$ connected using optical switches 220 and 270 and a wet plant 204, where N is an integer greater than one. For example, transmitters $210_1$-$210_N$ can be located at landing station $102_1$ (FIG. 1). Receivers $280_1$-$280_N$ can be located at landing station $102_2$ (FIG. 1). Wet plant 204 can be a part of wet plant 104 (FIG. 1). In some embodiments, optical switches 220 and 270 may be absent.

In an example embodiment, each of WDM transmitters $210_1$-$210_N$ comprises a respective transmitter set having n transmitters 212, each operating at a respective one of carrier wavelengths $\lambda_1$-$\lambda_n$. The outputs of the n transmitters 212 in an individual WDM transmitter 210 are connected to a respective wavelength MUX 214, and the output of the MUX is connected to optical switch 220 as indicated in FIG. 2. MUX 214 may include or implement MUX $130_1$ (FIG. 1). An individual transmitter 212 may include a respective laser and a respective optical modulator (not explicitly shown in FIG. 2) connected and operated as known in the pertinent art.

Optical switch 220 can be an N×P optical switch that is capable of connecting any of its N input ports to any of its P output ports, where P≥N. In a typical configuration, different input ports of optical switch 220 are connected to different respective output ports thereof. Optical switch 220 can change the input/output port connections in response to a control signal 218.

In an example embodiment, each of WDM receivers $280_1$-$280_N$ comprises a respective receiver set having n receivers 282, each configured to receive and detect a respective one of carrier wavelengths $\lambda_1$-$\lambda_n$. The inputs of the n transmitters 282 in an individual WDM receiver 280 are connected to a respective wavelength DMUX 284, and the input of the DMUX is connected to optical switch 270 as indicated in FIG. 2. DMUX 284 may include or implement DMUX $136_2$ (FIG. 1). An individual receiver 282 may include a respective photodetector (not explicitly shown in FIG. 2) connected and operated as known in the pertinent art.

Optical switch 270 can be a P×N optical switch that is capable of connecting any of its N output ports to any of its P input ports. In a typical configuration, different output ports of optical switch 270 are connected to different respective input ports thereof. Optical switch 270 can change the input/output port connections in response to a control signal 268.

In operation, control signals 218 and 268 are generated to connect each of WDM transmitters $210_1$-$210_N$ to a corresponding one of WDM receivers $280_1$-$280_N$ by way of a dedicated optical path 240 across cable plant 204. In different embodiments, an optical path 240 can be implemented, e.g., using a dedicated fiber, a core of a multi-core fiber, or a mode of a multi-mode fiber. Each of the optical paths 240 typically includes one or more optical amplifiers 160, e.g., connected as indicated in FIG. 2.

In an example embodiment, the numbers P and N can be related as follows:

$$P = N + m \times k \quad (1)$$

where m is a positive integer, and k is a non-negative integer. In some embodiments, k=0. In some embodiments, the number N is an integer multiple of m.

In operation, m×k of the P optical paths 240 across cable plant 204 may not carry any payload traffic. However, these optical paths 240 can be engaged to carry payload traffic, e.g., in case of a failure of any of the N paths that are used to carry payload traffic between WDM transmitters $210_1$-$210_N$ and WDM receivers $280_1$-$280_N$. This capability can beneficially be used to protect traffic flows through system 200 from disruptions.

In some embodiments, additional transponders may be installed, e.g., for transmitting low-priority traffic on the m×k protection paths 240. Such low-priority traffic can be rerouted or discontinued if the corresponding protection path(s) 240 need(s) to be used for carrying payload traffic.

In some embodiments, the optical paths 240 that do not carry any traffic at a given point in time may be powered down, e.g., by powering down the corresponding optical amplifiers 160. Such powering down can beneficially be used, e.g., to conserve the cable power (which can be relatively expensive).

In an example embodiment, optical amplifiers 160 may fail jointly, e.g., in arrays of m co-located optical amplifiers 160. An example of such failure is indicated in FIG. 2 using a strike sign 262. Due to the event 262, the m amplifiers of an OA array 260 may become disabled and/or non-functional. A person of ordinary skill in the art will understand that individual amplifier failures can be described by m=1. For embodiments in which k=0 (i.e., with no protection paths being available in wet plant 204), the failure of an entire repeater bottle can be described by m=N.

Through experimentation and computer simulation, we have determined that practically sufficient protection can typically be achieved by an embodiment corresponding to k=1, irrespective of m. This unexpected result demonstrates that the cost of achieving practically sufficient fault protection can be relatively low in at least some embodiments.

In some embodiments, it may be beneficial to connect m optical paths 240 such that a failure of any OA array 260 connected to those m optical paths 240 within the entirety of wet plant 204 can affect only those m optical paths 240, but not other optical paths 240. The m optical paths 240 so connected may be referred to as a failure group (also see FIG. 3). In some embodiments, it may be beneficial to randomly or deterministically re-arrange connections from span to span within a failure group. For example, a span-by-span alternation of the cores over which signals are sent within a multi-core fiber can be beneficial. In this case, a signal path alternates between center-core(s) and edge-core(s) on a span-by-span basis. Some embodiments employing such a span-by-span alternation may benefit from the use of at least some features disclosed in U.S. Pat. No. 9,344,779, which is incorporated herein by reference in its entirety.

In terms of resilience to failure, alternating the cores can be beneficial, e.g., when the size m of the associated OA arrays 260 is equal to or larger than the number of cores of the corresponding multi-core fiber.

FIG. 3 shows a block diagram of a power-supply subsystem 300 that can be used in system 200 (FIG. 2) according to an embodiment. For illustration purposes and without any implied limitations, FIG. 3 shows only two failure groups, which are labeled $320_1$ and $320_2$, respectively. A person of ordinary skill in the art will understand that system 200 may have more than two failure groups 320.

Group $320_1$ includes OA arrays $260_{1,1}$-$260_{1,L}$ connected to optical paths $240_1$-$240_m$ as indicated in FIG. 3. Each of OA arrays $260_{1,1}$-$260_{1,L}$ has m optical amplifiers 160 and can be powered up or down, as a group, using a respective one of electrical switches $330_{1,1}$-$330_{1,L}$, which are connected to power line 312 as indicated in FIG. 3. A power-supply unit 310 located at landing station $102_1$ or landing station $102_2$ can be used in a conventional manner to power up the power line 312.

Group $320_2$ similarly includes OA arrays $260_{2,1}$-$260_{2,L}$ connected to optical paths $240_{m+1}$-$240_{2m}$. Each of OA arrays $260_{2,1}$-$260_{2,L}$ also has m optical amplifiers 160 and can be powered up or down, as a group, using a respective one of electrical switches $330_{2,1}$-$330_{2,L}$ connected to the power line 312.

In an example embodiment, switches $330_{1,1}$-$330_{1,L}$ and $330_{2,1}$-$330_{2,L}$ may be individually controllable. In this case, each of OA arrays 260 can be powered up or down independent of other OA arrays 260.

In another example embodiment, switches $330_{1,1}$-$330_{1,L}$ may be controllable as a group, and switches $330_{2,1}$-$330_{2,L}$ may be separately controllable as a group. In this case, OA arrays $260_{1,1}$-$260_{1,L}$ can be powered up or down together as a group; and OA arrays $260_{2,1}$-$260_{2,L}$ can independently be powered up or down together as another group.

Figure 4:
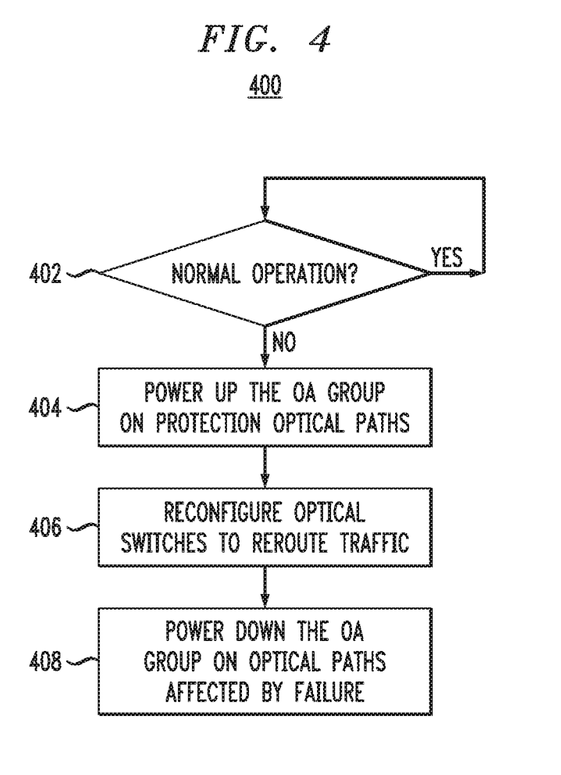
FIG. 4 shows a flowchart of an operating method that can be used in the system of FIG. 2 according to an embodiment.

FIG. 4 shows a flowchart of an operating method 400 that can be used in system 200 according to an embodiment. Method 400 is described, by way of example, in continued reference to FIGS. 1-3.

At step 402 of method 400, ME unit 120 operates to monitor the status of various optical amplifiers 160, e.g., as known in the pertinent art. The monitoring results are used in a conventional manner to determine whether or not system 200 is operating normally.

In a typical configuration corresponding to the "normal operation" of system 200, the protection optical paths 240 that do not carry any traffic are powered down. For example, if optical paths $240_{m+1}$-$240_{2m}$ (FIG. 3) do not carry any traffic, then OA group $320_2$ may not be receiving any electrical power, e.g., due to the electrical switches $330_{2,1}$-$330_{2,L}$ being in the OFF state. At the same time, OA group $320_1$ (FIG. 3) may be receiving electrical power, e.g., due to the electrical switches $330_{1,1}$-$330_{1,L}$ being in the ON state. The latter enables optical paths $240_1$-$240_m$ (FIG. 3) to transmit optical signals.

If the ME unit 120 determines that system 200 is operating normally, then method 400 continuously loops through the processing corresponding to step 402.

A possible traffic disruption may occur, e.g., due to the event 262 causing a failure of one or more optical amplifiers 160 in OA array $260_{1,2}$, as indicated in FIG. 3. If such a failure occurs, then the ME unit 120 detects the corresponding working-path failure and activates a suitable protection mechanism in system 200. As a result, the processing of method 400 is directed to step 404.

At step 404, the system controller causes an OA group corresponding to the protection optical paths 240 to be powered up. For example, the system controller may reconfigure electrical switches $330_{2,1}$-$330_{2,L}$ from being in the OFF state to being in the ON state. This switch reconfiguration causes electrical power to be applied to OA group $320_2$, which powers up the constituent optical amplifiers 160 therein.

At step 406, the system controller generates control signals 218 and 268 to reconfigure optical switches 220 and 270 such that the traffic is rerouted from the optical paths 240 corresponding to the OA group affected by the event 262 to the protection optical paths 240 powered up at step 404. For example, the system controller may generate control signals 218 and 268 such that optical switches 220 and 270 reroute the traffic previously flowing through optical paths $240_1$-$240_m$ to flow through optical paths $240_{m+1}$-$240_{2m}$ (see FIG. 3).

At step 408, the system controller causes an OA group affected by the event 262 to be powered down. For example, the system controller may reconfigure electrical switches $330_{1,1}$-$330_{1,L}$ from being in the ON state to being in the OFF state. This switch reconfiguration causes power line 312 to be disconnected from OA group $320_1$, which causes the constituent optical amplifiers 160 therein to be powered down.

Figure 5:
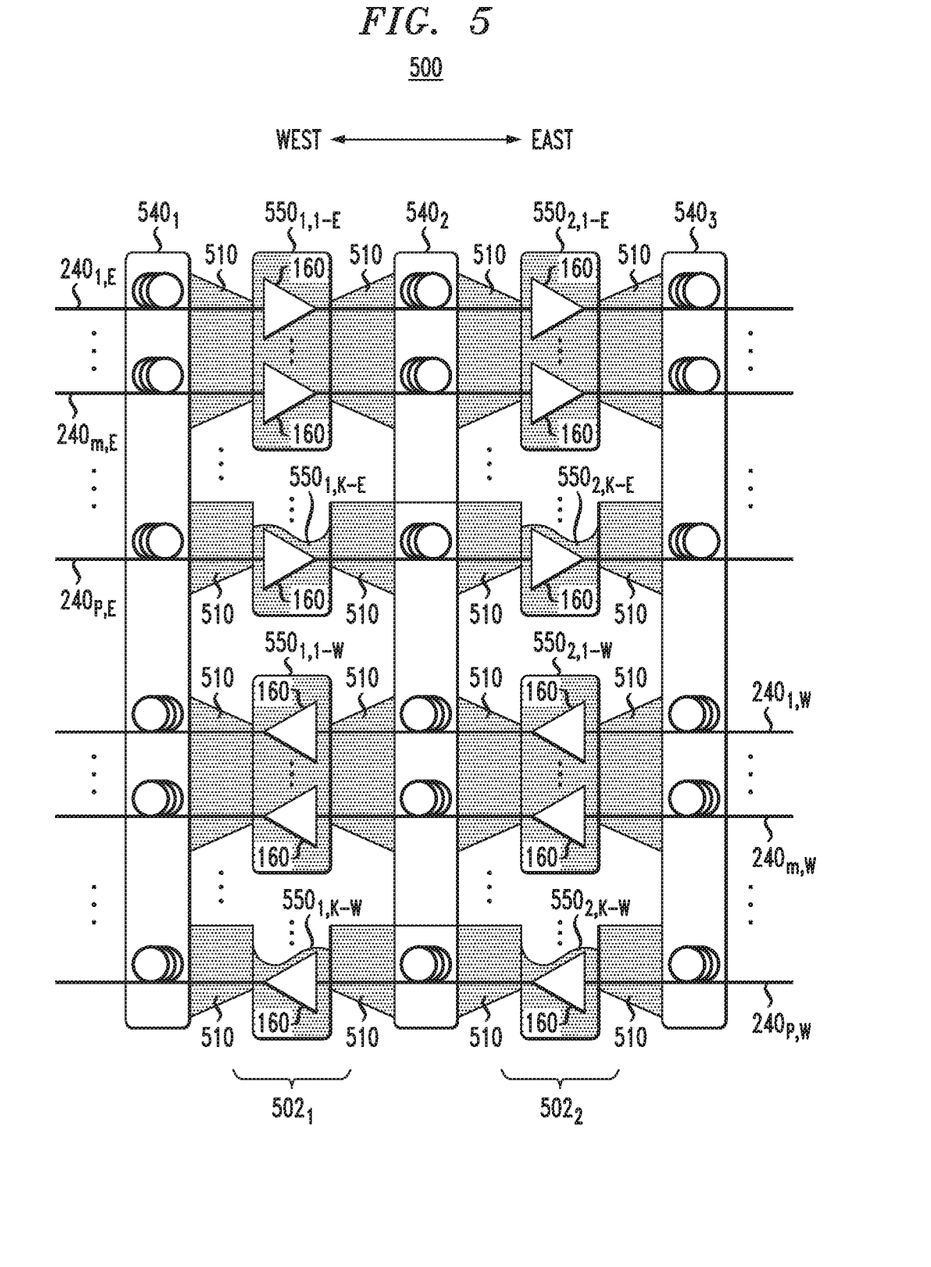
FIG. 5 shows a block diagram of a segment of the wet plant that can be used in the optical communication system of FIG. 1 according to an embodiment.

FIG. 5 shows a block diagram of a segment 500 of wet plant 104 according to an embodiment. Segment 500 includes two repeater sites, which are labeled $502_1$ and $502_2$, respectively. In an example embodiment, the physical size of a repeater site 502 does not exceed ~100 m. In some embodiments, said physical size may not exceed ~10 m. In the shown embodiment, the number P is an integer multiple of the number m, i.e., P=Km, where K is an integer greater than one. In other embodiments, other numbers P and m can also be used, as indicated above in reference to FIG. 2.

The equipment located at repeater site $502_1$ is connected to the adjacent portion of wet plant 104 using a fiber-cable span $540_1$. The equipment located at repeater site $502_1$ is further connected to the equipment located at repeater site $502_2$ using a fiber-cable span $540_2$. The equipment located at repeater site $502_2$ is connected to the adjacent portion of wet plant 104 using a fiber-cable span $540_3$.

As an example and without any implied limitations for the orientation of segment 500, the traffic directions in segment 500 are referred to as being the Eastward direction (or E) and the Westward direction (or W). Each of fiber-cable spans $540_1$-$540_3$ supports P optical paths 240 per direction. The optical paths $240_{1,E}$-$240_{P,E}$ are configured to carry optical signals in the Eastward direction. The optical paths $240_{1,W}$-$240_{P,W}$ are similarly configured to carry optical signals in the Westward direction.

Each of repeater sites $502_1$ and $502_2$ has 2P optical amplifiers 160 that are housed in 2K respective repeater bottles 550, with each of the repeater bottles having a respective OA array 260 having m optical amplifiers 160 (also see FIGS. 2-3). In FIG. 5, each repeater bottle is labeled using the reference numeral 550 having a respective subscript, wherein the first number indicates the site number, the second number indicates the bottle number, and the letter E or W indicates the direction in which the optical signals flow through the bottle. The 2K repeater bottles 550 at each of repeater sites $502_1$ and $502_2$ are connected to the respective fiber spans 540 using appropriate cable adapters 510.

Figure 6:
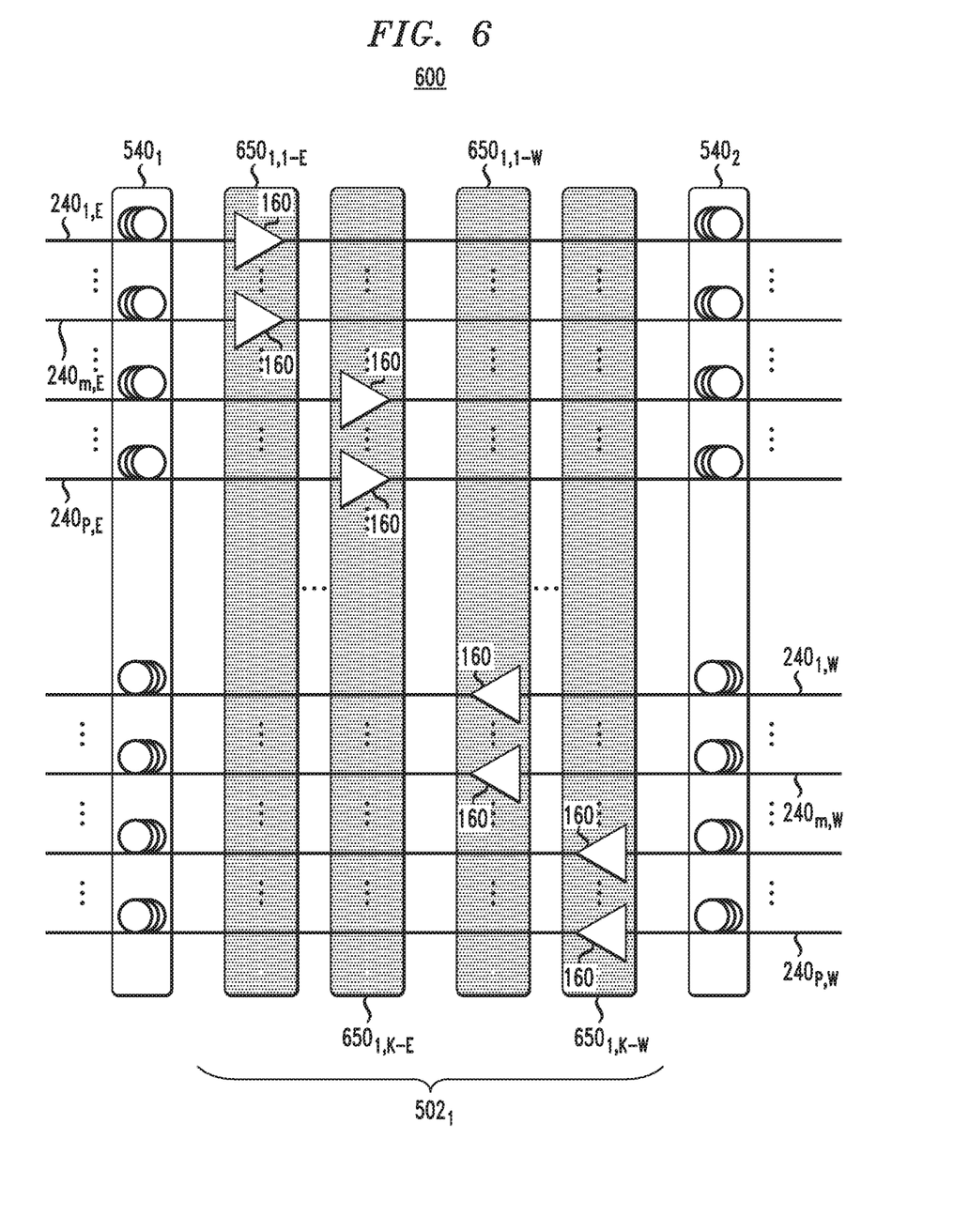
FIG. 6 shows a block diagram of a segment of the wet plant that can be used in the optical communication system of FIG. 1 according to another embodiment.

FIG. 6 shows a block diagram of a segment 600 of wet plant 104 according to another embodiment. For illustration purposes and without any implied limitations, segment 600 is shown and described as being located at repeater site $502_1$. Segment 600 uses many of the same elements as segment 500 (see FIG. 5), and these elements are labeled in FIG. 6 using the same labels as in FIG. 5.

In segment 600, repeater bottles $550_{1,1-E}$-$550_{1,K-E}$ and $550_{1,1-W}$-$550_{1,K-W}$ are replaced by repeater bottles $650_{1,1-E}$-$650_{1,K-E}$ and $650_{1,1-W}$-$650_{1,K-W}$, respectively. Bottle 650 differs from bottle 550 in that, in addition to an OA array 260 having m optical amplifiers 160, bottle 650 has (P-m) non-amplified optical feed-through paths. As such, branching the cable into parallel bottles in segment 600 and the use of cable adapters 510 can be avoided.

Figure 7:
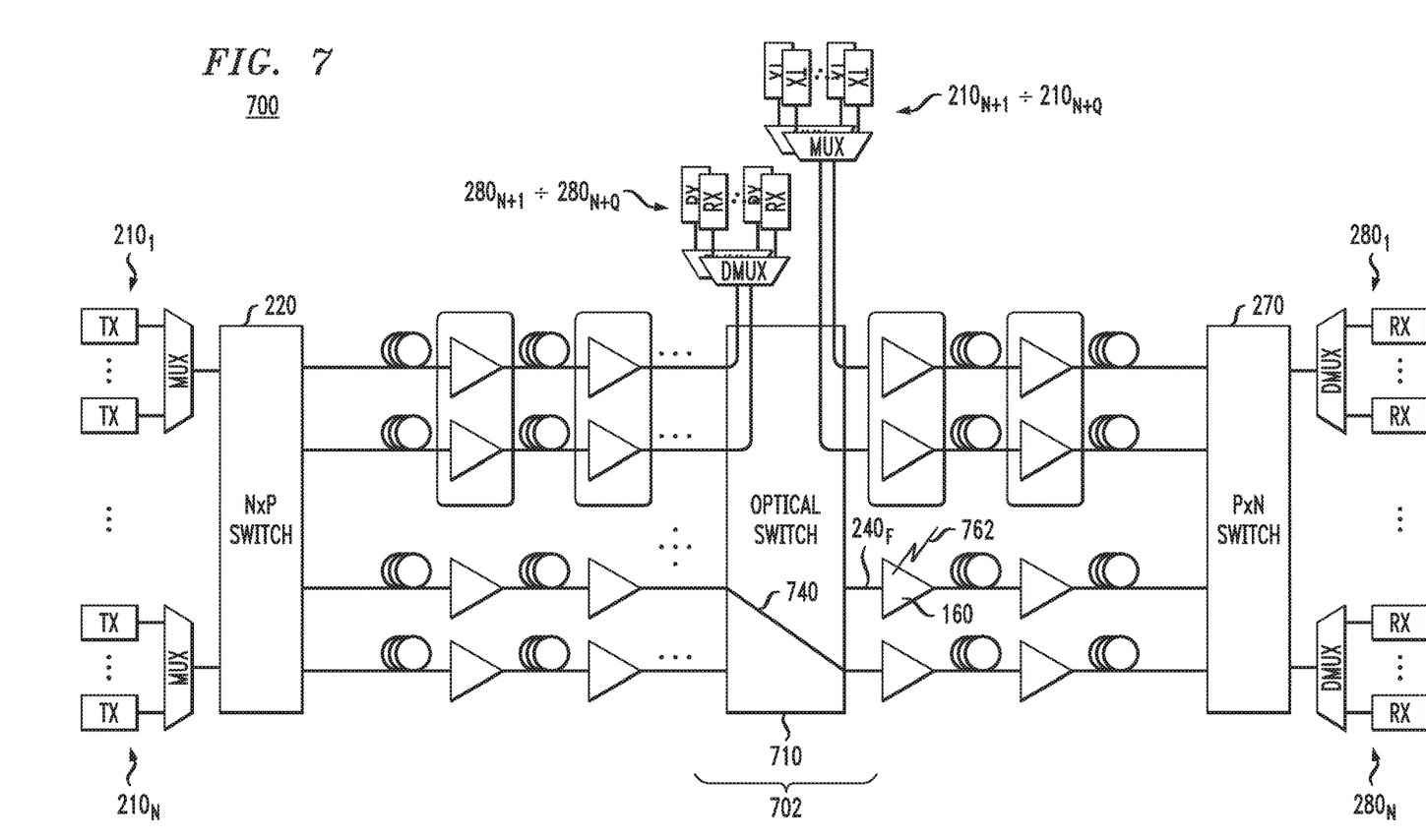
FIG. 7 shows a block diagram of a unidirectional optical communication system that can be used in the optical communication system of FIG. 1 according to another embodiment.

FIG. 7 shows a block diagram of a unidirectional optical communication system 700 that can be used in system 100 (FIG. 1) according to another embodiment. System 700 is a modification of system 200 (FIG. 1), according to which a mid-span add/drop site 702 is added thereto.

In an example embodiment, site 702 has an optical switch 710, WDM transmitters $210_{N+1}$-$210_{N+Q}$, and WDM receivers $280_{N+1}$-$280_{N+Q}$. The input/output connectivity implemented in optical switch 710 may depend on the numbers P, Q, and (P-N). For example, optical switch 710 may be constructed such that: (i) any Q of the N WDM signals transmitted by WDM transmitters $210_1$-$210_N$ can be dropped at site 702; (ii) up to Q replacement WDM signals can be added at site 702; and (iii) up to m×k protection optical paths 240 can be used to reroute optical signals around one or more failed optical paths 240. As an example, FIG. 7 shows an optical path 740 through optical switch 710 that can be used to direct the corresponding optical signals around the optical path $240_F$, wherein an optical amplifier 160 that has failed due to an event 762 is located. The fault-protection capability provided by optical switch 710 can beneficially be used in system 700 in addition to the fault-protection capability described above in reference to system 200.

At least some of the following additional features can be implemented in at least some embodiments:
  (i) m protection paths 240 may be used to protect many (>20) other paths 240 per direction in a point-to-point configuration, where all paths share a common cable and where m is the number of paths in a single failure group 320;
  (ii) any optical path may be implemented using a dedicated fiber, a core of a multi-core fiber, or a mode of a multi-mode fiber;
  (iii) OA arrays 260 can be multi-core OAs, multi-mode OAs, or individual OAs sharing a common pump and/or some other pertinent circuitry; and
  (iv) OA arrays 260 can be semiconductor optical amplifier arrays.

According to an example embodiment disclosed above, e.g., in the summary section and/or in reference to any one or any combination of some or all of FIGS. 1-7, provided is an apparatus (e.g., 100, FIG. 1) comprising: an optical fiber cable having an electrical power line (e.g., 312, FIG. 3), a sequence of optical fiber segments (e.g., 540, FIG. 5), and a plurality of optical amplifiers (e.g., 160, FIGS. 1-3, 5-7), the optical amplifiers connecting successive ones of the optical fiber segments to form at least first and second disjoint groups (e.g., $320_1$, $320_2$, FIG. 3) of parallel optical paths (e.g., 240, FIGS. 2, 3, 5, 6) between ends (e.g., located at 220 and 270, FIG. 2) of the optical fiber cable, the electrical power line being connectable to power the optical amplifiers; and wherein the electrical power line is operable to selectively power (e.g., using 330, FIG. 3), as a group, the optical amplifiers of either of the first and second disjoint groups.

In some embodiments of the above apparatus, the optical paths are arranged in at least three disjoint groups (e.g., as shown in FIG. 5); and wherein the electrical power line is operable to selectively power, as a group, the optical amplifiers of any of the at least three disjoint groups.

In some embodiments of any of the above apparatus, first and second ones of the optical fiber segments (e.g., $540_1$ and $540_2$, FIG. 6) are connected by serially optically connected first and second optical amplification modules (e.g., $650_{1,1-E}$, $650_{1,K-E}$, FIG. 6) such that light of the optical paths of each of the first and second disjoint groups is amplified in, at most, one of the first and second optical amplification modules.

In some embodiments of any of the above apparatus, each of the first and second optical amplification modules has one or more respective amplified optical feed-through paths and one or more respective non-amplified optical feed-through paths (e.g., as shown in FIG. 6).

In some embodiments of any of the above apparatus, the first and second optical amplification modules are parts of first and second repeater bottles, respectively.

In some embodiments of any of the above apparatus, first and second ones of the optical fiber segments (e.g., $540_1$ and $540_2$, FIG. 5) are optically connected by first and second optical amplification modules (e.g., $550_{1,1-E}$, $550_{1,K-E}$, FIG. 5) connected in parallel to one another such that light of the optical paths of each of the first and second disjoint groups is amplified in a respective one of the first and second optical amplification modules.

In some embodiments of any of the above apparatus, the first and second optical amplification modules are parts of first and second repeater bottles, respectively.

In some embodiments of any of the above apparatus, each of the optical fiber segments includes a plurality of parallel single-mode optical fibers.

In some embodiments of any of the above apparatus, each of the optical fiber segments includes a multi-mode optical fiber.

In some embodiments of any of the above apparatus, each of the optical fiber segments includes a multi-core optical fiber.

In some embodiments of any of the above apparatus, the apparatus of further comprises an optical switch (e.g., 220 or 270, FIG. 2) and a set of one or more WDM optical transmitters (e.g., $210_1$-$210_N$, FIG. 2) or a set of one or more WDM optical receivers (e.g., $280_1$-$280_N$, FIG. 2); and wherein the optical switch has first ports optically connected to one end of the optical fiber cable and second ports connected to the one or more WDM optical transmitters or the one or more WDM optical receivers and is able to selectively connect each of the one or more WDM optical transmitters or receivers to a different one of the optical paths of the optical fiber cable.

In some embodiments of any of the above apparatus, the optical fiber cable has more optical paths connected to the first ports of the optical switch than a number of the WDM optical transmitters or receivers connected to the second ports of the optical switch (e.g., P>N, FIG. 2).

In some embodiments of any of the above apparatus, the optical switch has a number of the first ports that is greater than a number of the second ports (e.g., P>N, FIG. 2).

In some embodiments of any of the above apparatus, the apparatus of further comprises a plurality of repeater modules connected between two successive ones of the optical fiber segments (e.g., $540_1$ and $540_2$, FIGS. 5, 6) at a same splice location of the optical fiber cable; and wherein different repeater modules have optical amplifiers of different ones of the disjoint groups.

In some embodiments of any of the above apparatus, a distance between any two repeater modules of the plurality is smaller than 10 m (or 30 m, or 100 m).

In some embodiments of any of the above apparatus, the repeater modules are submersible.

In some embodiments of any of the above apparatus, the apparatus of further comprises a plurality of electrical switches (e.g., 330, FIG. 3), each being configurable to power up or down, as a group, the optical amplifiers of a different respective one of the repeater modules.

In some embodiments of any of the above apparatus, the apparatus of further comprises a plurality of electrical switches (e.g., 330, FIG. 3) configured to power up and down the optical amplifiers of the first and second disjoint groups independent of one another.

In some embodiments of any of the above apparatus, the optical fiber cable is connected to transmit optical signals between the ends thereof in two opposite directions.

In some embodiments of any of the above apparatus, the plurality of optical paths has between 50 and 500 optical paths (or between 50 and 200 optical paths, or between 80 and 150 optical paths).

According to another example embodiment disclosed above, e.g., in the summary section and/or in reference to any one or any combination of some or all of FIGS. 1-7, provided is an apparatus (e.g., 100, FIG. 1) comprising: an optical fiber cable having an electrical power line (e.g., 312, FIG. 3), a sequence of optical fiber segments (e.g., 540, FIG. 5), and a plurality of optical amplifiers (e.g., 160, FIGS. 1-3, 5-7), the optical amplifiers connecting successive ones of the optical fiber segments to form at least first and second parallel optical paths (e.g., 240, FIGS. 2, 3, 5, 6) between ends (e.g., located at 220 and 270, FIG. 2) of the optical fiber cable, the electrical power line being connectable to power the optical amplifiers; and wherein the electrical power line is operable to selectively power (e.g., using 330, FIG. 3), as a group, the optical amplifiers of either of the first and second parallel optical paths.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein and in the claims, the term "provide" with respect to a system, device, or component encompasses designing or fabricating the system, device, or component; causing the system, device, or component to be designed or fabricated; and/or obtaining the system, device, or component by purchase, lease, rental, or other contractual arrangement.

What is claimed is:

1. An apparatus, comprising:
   an optical fiber cable having an electrical power line, a sequence of optical fiber segments, and a plurality of optical amplifiers, the optical amplifiers connecting successive ones of the optical fiber segments to form at least first and second disjoint groups of parallel optical paths between ends of the optical fiber cable, the electrical power line being connectable to power the optical amplifiers; and
   wherein the electrical power line is operable to selectively power, as a group, the optical amplifiers of either of the first and second disjoint groups.

2. The apparatus of claim 1,
   wherein the optical paths are arranged in at least three disjoint groups; and
   wherein the electrical power line is operable to selectively power, as a group, the optical amplifiers of any of the at least three disjoint groups.

3. The apparatus of claim 1, wherein first and second ones of the optical fiber segments are connected by serially optically connected first and second optical amplification modules such that light of the optical paths of each of the first and second disjoint groups is amplified in, at most, one of the first and second optical amplification modules.

4. The apparatus of claim 3, wherein each of the first and second optical amplification modules has one or more respective amplified optical feed-through paths and one or more respective non-amplified optical feed-through paths.

5. The apparatus of claim 3, wherein the first and second optical amplification modules are parts of first and second repeater bottles, respectively.

6. The apparatus of claim 1, wherein first and second ones of the optical fiber segments are optically connected by first and second optical amplification modules connected in parallel to one another such that light of the optical paths of each of the first and second disjoint groups is amplified in a respective one of the first and second optical amplification modules.

7. The apparatus of claim 6, wherein the first and second optical amplification modules are parts of first and second repeater bottles, respectively.

8. The apparatus of claim 1, wherein each of the optical fiber segments includes a plurality of parallel single-mode optical fibers.

9. The apparatus of claim 1, wherein each of the optical fiber segments includes a multi-mode optical fiber.

10. The apparatus of claim 1, wherein each of the optical fiber segments includes a multi-core optical fiber.

11. The apparatus of claim 1, further comprising an optical switch and a set of one or more WDM optical transmitters or a set of one or more WDM optical receivers; and
    wherein the optical switch has first ports optically connected to one end of the optical fiber cable and second ports connected to the one or more WDM optical transmitters or the one or more WDM optical receivers and is able to selectively connect each of the one or more WDM optical transmitters or receivers to a different one of the optical paths of the optical fiber cable.

12. The apparatus of claim 11, wherein the optical switch has a number of the first ports that is greater than a number of the second ports.

13. The apparatus of claim 1, further comprising a plurality of repeater modules connected between two successive ones of the optical fiber segments at a same splice location of the optical fiber cable; and
    wherein different repeater modules have optical amplifiers of different ones of the disjoint groups.

14. The apparatus of claim 13, wherein a distance between any two repeater modules of the plurality is smaller than 10 m.

15. The apparatus of claim 13, wherein the repeater modules are submersible.

16. The apparatus of claim 13, further comprising a plurality of electrical switches, each being configurable to power up or down, as a group, the optical amplifiers of a different respective one of the repeater modules.

17. The apparatus of claim 1, further comprising a plurality of electrical switches configured to power up and down the optical amplifiers of the first and second disjoint groups independent of one another.

18. The apparatus of claim 1, wherein the optical fiber cable is connected to transmit optical signals between the ends thereof in two opposite directions.

19. The apparatus of claim 1, wherein the plurality of optical paths has between 50 and 500 optical paths.

20. An apparatus, comprising:
   an optical fiber cable having an electrical power line, a sequence of optical fiber segments, and a plurality of optical amplifiers, the optical amplifiers connecting successive ones of the optical fiber segments to form at least first and second parallel optical paths between ends of the optical fiber cable, the electrical power line being connectable to power the optical amplifiers; and
   wherein the electrical power line is operable to selectively power, as a group, the optical amplifiers of either of the first and second parallel optical paths.

* * * * *